United States Patent
Yang

(10) Patent No.: US 9,277,061 B2
(45) Date of Patent: Mar. 1, 2016

(54) METHOD OF PROVIDING MOBILE BILL AND SERVER FOR PERFORMING THE SAME

(71) Applicant: LG CNS CO., LTD., Seoul (KR)

(72) Inventor: Junkyu Yang, Seoul (KR)

(73) Assignee: LG CNS CO., LTD., Seoul (KR)

( * ) Notice: Subject to any disclaimer, the term of this patent is extended or adjusted under 35 U.S.C. 154(b) by 40 days.

(21) Appl. No.: 14/144,332

(22) Filed: Dec. 30, 2013

(65) Prior Publication Data

US 2014/0357223 A1     Dec. 4, 2014

(30) Foreign Application Priority Data

May 29, 2013    (KR) .......................... 10-2013-0060784

(51) Int. Cl.
*H04W 4/26*     (2009.01)
*H04M 15/00*    (2006.01)
*H04W 4/24*     (2009.01)

(52) U.S. Cl.
CPC .............. *H04M 15/44* (2013.01); *H04M 15/67* (2013.01); *H04M 15/83* (2013.01); *H04W 4/24* (2013.01); *H04W 4/26* (2013.01)

(58) Field of Classification Search
CPC ..... H04M 15/44; H04M 15/67; H04M 15/83; H04W 4/26; H04W 4/24
USPC ................................................... 455/406–408
See application file for complete search history.

(56) References Cited

U.S. PATENT DOCUMENTS

2014/0222669 A1*  8/2014  Novak et al. .................... 705/40

FOREIGN PATENT DOCUMENTS

| KR | 10-0668602 A | 1/2007 |
| KR | 10-0736930 A | 7/2007 |
| KR | 10-2009-0000726 A | 1/2009 |
| KR | 10-2012-0091876 A | 8/2012 |

* cited by examiner

*Primary Examiner* — Sam Bhattacharya

(57) ABSTRACT

A mobile bill providing server receives bill details for a particular user from a mobile bill issuing server and provides a mobile bill to a mobile terminal available for installation of a bill viewer, the mobile bill being dependent upon the bill viewer. A mobile bill providing method includes searching for the mobile terminal associated with the particular user and determining whether the bill viewer has been installed in the mobile terminal. If the bill viewer has not been installed in the mobile terminal, the method includes transmitting an electronic bill independent of the bill viewer and guidance information for installation of the bill viewer to the mobile terminal, waiting for a period of time until the bill viewer is installed in the mobile terminal, and when the bill viewer is installed, transmitting the mobile bill to the mobile terminal.

20 Claims, 5 Drawing Sheets

METHOD OF PROVIDING MOBILE BILL AND SERVER FOR PERFORMING THE SAME

CROSS-REFERENCES

The present application claims the benefit of Korean Patent Application No. 10-2013-0060784 filed on May 29, 2013, which is hereby incorporated by reference in its entirety.

BACKGROUND OF THE INVENTION

1. Field of the Invention

The present invention relates to a technique for providing a mobile bill and, more particularly, to a mobile bill providing method and server capable of providing a mobile terminal with a mobile bill generated based on a statement (or bill details) received from a mobile bill issuing server.

2. Related Art

A bill issued by a bill issuing company (e.g., a credit card company) used to be sent using an offline electronic billing system (or giro). Recently, however, due to the development of online technologies, a bill (hereinafter, a "mobile bill") can be sent to and viewed on a user's mobile terminal (e.g., a smart phone). As a result, billing procedures are simplified and user convenience is increased.

Various technologies for providing mobile bills have been proposed.

Korean Patent Laid Open Publication No. 10-2009-0000726 discloses a method of providing a wireless push-based bill to a mobile terminal. This method includes receiving an execution application for the wireless push-based bill, receiving a short message associated with the wireless push-based bill from a bill providing server that provides the wireless push-based bill, establishing a communication connection using a mobile communication network to the bill providing server automatically in response to the received short message or in response to an acknowledgement input of a user, transmitting identification information of the mobile terminal to the bill providing server, and receiving a selected wireless push-based bill from the bill providing server on the basis of the identification information of the mobile terminal. The received wireless push-based bill is provided on the basis of the execution application, and a user input with respect to the wireless push-based bill is transmitted to the bill providing server.

Korean Patent Laid Open Publication No. 10-2012-0091876 discloses a customized mobile contents service technique. The technique includes a mobile contents service device and a user terminal. The mobile contents service device checks a type of the user terminal included in transmission data issued by a contents issuing server by using stored meta data, generates mobile contents by using a stored template according to the type of the user terminal, transmits a message to the user terminal to notify of the generation of the mobile contents, and transmits the mobile contents in response to a mobile contents download request. The user terminal receives the message notifying of the generation of the mobile contents from the mobile contents service device, downloads the mobile contents, and displays the mobile contents for a user.

In the related art, a bill can be automatically provided to a user's mobile terminal, and information in association with the bill can also be provided. Thus, a company may reduce management burden and costs. In addition, a user can check both the bill and the information in association with the bill, and mobile data charges resulting from checking the bill and associated information can be reduced.

Also, in the related art, user information is checked using meta data and templates based on an information product issued by a content-issuing institution. Mobile content is generated according to types of the content-issuing institution and a user terminal and transmitted to the user terminal. The mobile content is downloaded using a mobile content program installed in the user terminal and displayed for a user. As a result, the user can easily download a variety of mobile content regardless of terminal type.

However, the related art primarily focuses on a method for converting offline content into online content and transmitting the online content electronically.

Also, when a program for checking a mobile bill is not installed in a mobile terminal, when the program has been installed but not executed, or when the program has been installed but deleted afterwards, a user may not see the mobile bill. The foregoing related art fails to provide a technical method or configuration for solving such problems.

That is, the related art proposes techniques for simply converting offline content into electronic content that may be processed in a mobile terminal. However, those techniques are incapable of stably providing a bill based on an environment of the mobile terminal.

SUMMARY

Embodiments are directed to a mobile bill providing method and a server capable of providing a mobile bill generated based on a statement (or bill details) received from a mobile bill issuing server, and determining whether or not a mobile terminal has a bill viewer installed therein to output the mobile bill, and providing an electronic bill if the bill viewer is not installed, thereby stably providing the mobile bill regardless of the environment of the mobile terminal.

Another object of the present invention is to provide a mobile bill providing method and a server capable of transmitting an electronic bill to a mobile terminal independent of a bill viewer and transmitting guidance information for installation of the bill viewer to the mobile terminal to install the bill viewer, so that the user can check the mobile bill.

Still another object of the present invention is to provide a mobile bill providing method and server capable of transmitting a push message recognizable by a bill viewer to a mobile terminal, and determining whether or not return data corresponding to the push message is received within a particular period of time to determine whether or not the mobile terminal is currently in an environment in which it can receive a mobile bill.

In one aspect of the present invention, there is provided a mobile bill providing method performed by a mobile bill providing server which receives bill details of a particular user through a mobile bill issuing server and provides a mobile bill to a mobile terminal available for installation of a bill viewer, the mobile bill being dependent upon the bill viewer. The mobile bill providing method may include: searching a mobile terminal associated with the particular user and determining whether the bill viewer has been installed in the mobile terminal; when the bill viewer has not been installed at a point in time at which the mobile bill is provided, transmitting an electronic bill independent from the bill viewer and transmitting guidance information regarding installation of the bill viewer; waiting until when the bill viewer is installed for a pre-set first period of time; and when the bill viewer is installed, transmitting the mobile bill to the mobile terminal.

In an embodiment, the transmitting of the guidance information regarding installation of the bill viewer may include: transmitting one of a short message, a push message, and an e-mail including an access key to the bill details issued by the mobile bill issuing server, as an electronic bill, to the mobile terminal.

In an embodiment, the transmitting of the guidance information regarding installation of the bill viewer may include: transmitting one of a short message, a push message, and an e-mail including guidance text or Web uniform resource locator (URL) with respect to installation of the bill viewer, as an installation inducement message, to the mobile terminal.

In an embodiment, the transmitting of the guidance information regarding installation of the bill viewer may include: in a case in which the bill viewer has already been installed at a point in time at which the mobile bill is provided, transmitting the push message including an access key to the mobile bill to the mobile terminal.

In an embodiment, the transmitting of the guidance information regarding installation of the bill viewer may include: when return data with respect to the push message is not received for a pre-set second period of time, reducing the second period of time by stages to update the second period of time, and retransmitting the push message.

In an embodiment, the determining whether the bill viewer has been installed may include: inquiring a mobile terminal information database (DB), which stores information regarding whether the bill viewer has been installed in a plurality of mobile terminals, as to whether the mobile terminal had installed the bill viewer therein previously.

In an embodiment, the determining whether the bill viewer has been installed may include: transmitting a push message recognizable by the bill viewer to the mobile terminal although the mobile terminal had installed the bill viewer therein previously.

In an embodiment, the determining whether the bill viewer has been installed may include: determining whether return data with respect to the push message is received within a pre-set third period of time.

In an embodiment, the determining whether the bill viewer has been installed may include: when return data is not received, determining that the bill viewer has not been installed at a point in time at which the mobile bill is provided.

In an embodiment, the determining whether the bill viewer has been installed may include: when return data is not received, correcting information regarding installation of the bill viewer with respect to the mobile terminal in the mobile terminal information DB.

In another aspect of the present invention, there is provided a mobile bill providing server which receives bill details of a particular user through a mobile bill issuing server and provides a mobile bill to a mobile terminal available for installation of a bill viewer. The mobile bill providing server may include: an installation determining unit configured to search a mobile terminal associated with the particular user and determine whether the bill viewer has been installed in the mobile terminal; a bill transmitting unit configured to transmit an electronic bill independent from the bill viewer when the bill viewer has not been installed at a point in time at which the mobile bill is provided; and an installation guiding unit configured to transmit guidance information regarding installation of the bill viewer, wherein the installation determining unit waits until when the bill viewer is installed for a pre-set first period of time, and when the bill viewer is installed, the bill transmitting unit transmits the mobile bill to the mobile terminal.

In an embodiment, the bill transmitting unit may transmit one of a short message, a push message, and an e-mail including an access key to the bill details issued by the mobile bill issuing server, as an electronic bill, to the mobile terminal.

In an embodiment, the installation guiding unit may transmit one of a short message, a push message, and an e-mail including guidance text or Web uniform resource locator (URL) with respect to installation of the bill viewer, as an installation inducement message, to the mobile terminal.

In an embodiment, in a case in which the bill viewer has already been installed at a point in time at which the mobile bill is provided, the bill transmitting unit may transmit the push message including an access key to the mobile bill to the mobile terminal.

In an embodiment, when return data with respect to the push message is not received for a pre-set second period of time, the bill transmitting unit may reduce the second period of time by stages to update the second period of time, and retransmit the push message.

In an embodiment, the installation determining unit may inquire a mobile terminal information database (DB), which stores information regarding whether the bill viewer has been installed in a plurality of mobile terminals, as to whether the mobile terminal had installed the bill viewer therein previously.

In an embodiment, although the mobile terminal had installed the bill viewer therein previously, the installation determining unit may transmit a push message recognizable by the bill viewer to the mobile terminal.

In an embodiment, the installation determining unit may determine whether return data with respect to the push message is received within a pre-set third period of time.

In an embodiment, when return data is not received, the installation determining unit may determine that the bill viewer has not been installed at a point in time at which the mobile bill is provided.

In an embodiment, when return data is not received, the installation determining unit may correct information regarding installation of the bill viewer with respect to the mobile terminal in the mobile terminal information DB.

In the case of the mobile bill providing method and relevant techniques according to an embodiment of the present invention, a mobile bill including bill details received from a mobile bill issuing server is generated, and whether a mobile terminal has a bill viewer installed therein for a mobile bill is determined to provide a mobile bill thereto, or an electronic bill independent from a bill viewer is provided thereto. Thus, a bill can be stably provided according to an environment of a mobile terminal.

In a mobile bill providing method and relevant techniques according to an embodiment of the present invention, in a case in which a bill viewer has not been installed in a mobile terminal at a point in time at which a mobile bill is provided to the mobile terminal, an electronic bill independent from a bill viewer and guidance information regarding installation of a bill viewer are transmitted to a mobile terminal. Thus, even if the mobile terminal is in an environment in which it cannot check a mobile bill, usage details can be transmitted and installation of a bill viewer can be guided.

In a mobile bill providing method and relevant techniques according to an embodiment of the present invention, a push message recognizable by a bill viewer is transmitted to a mobile terminal, and it is determined whether return data with respect to the push message has been received within a particular period of time. Thus, whether the mobile terminal is currently in an environment in which it can receive a mobile bill at a point in time at which the mobile bill is provided can be determined although the bill viewer was already installed in the mobile terminal.

BRIEF DESCRIPTION OF THE DRAWINGS

The above and other objects and features of the present invention will become apparent from the following description of embodiments given in conjunction with the accompanying drawings, in which.

DETAILED DESCRIPTION

Figure 1:
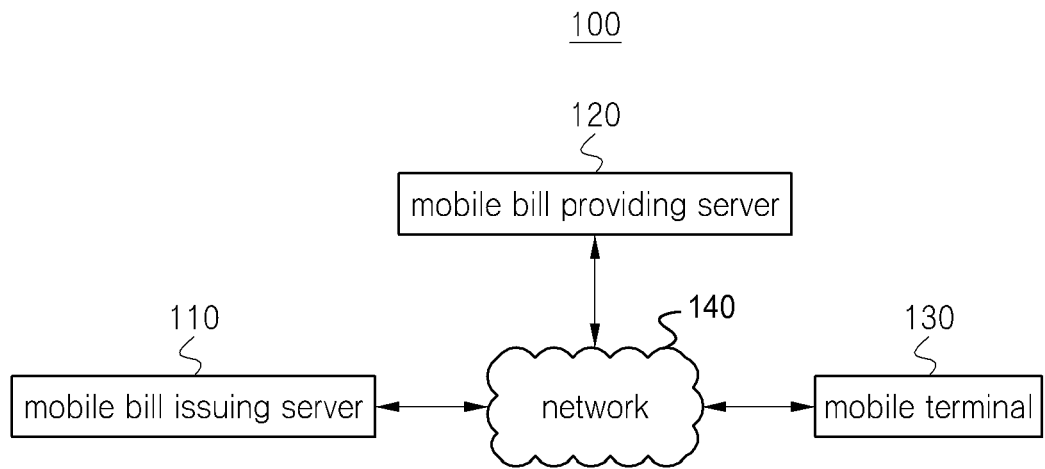
FIG. 1 illustrates a mobile bill providing system according to an embodiment of the present invention.

The technologies disclosed herein can be used in a variety of wireless communication systems, such as Code Division Multiple Access (CDMA), Frequency Division Multiple Access (FDMA) systems, Time Division Multiple Access (TDMA) systems, Orthogonal Frequency Division Multiple Access (OFDMA) systems, and Single-Carrier Frequency Division Multiple Access (SC-FDMA) systems. CDMA systems can be implemented using radio technology, such as Universal Terrestrial Radio Access (UTRA) or CDMA2000. TDMA systems can be implemented using radio technology, such as Global System for Mobile communications (GSM), General Packet Radio Service (GPRS), or Enhanced Data Rates for GSM Evolution (EDGE). OFDMA systems can be implemented using radio technology, such as IEEE (Institute of Electrical and Electronics Engineers) 802.11 (Wi-Fi), IEEE 802.16 (WiMAX), IEEE 802-20, or Evolved UTRA (E-UTRA). UTRA is part of a Universal Mobile Telecommunications System (UMTS). $3^{rd}$ Generation Partnership Project (3GPP) Long Term Evolution (LTE) is part of Evolved UTMS (E-UMTS) using Evolved-UMTS Terrestrial Radio Access (E-UTRA). The 3GPP LTE adopts OFDMA in downlink and SC-FDMA in uplink.

Descriptions of embodiments of the present invention provide structural and functional explanations. The scope of the present invention should not be limited to the embodiments described in the specification. That is, since embodiments may be implemented in several forms without departing from the spirit and scope of the present invention, it will be understood that embodiments of the present invention are not limited by details of the description provided herein, unless otherwise specified. Rather, embodiments of the present invention should be construed broadly within the scope defined by the appended claims. Therefore, various changes and modifications that fall within the scope of the claims, or equivalents of such scope, are intended to be embraced by the appended claims.

Terms described in the present disclosure should be understood as follows. While terms such as "first" and "second," etc., may be used to describe various components, such components are not limited by these terms. The above terms are used only to distinguish one component from another. For example, a first component may be referred to as a second component without departing from the scope of the present invention, and likewise a second component may be referred to as a first component.

It will be understood that when an element is referred to as being "connected to" another element, it can be directly connected to the other element or intervening elements may also be present. In contrast, when an element is referred to as being "directly connected to" another element, no intervening elements are present. In addition, unless explicitly described to the contrary, the word "comprise" and variations such as "comprises" or "comprising," will be understood to imply the inclusion of stated elements but not the exclusion of any other elements. Other expressions describing relationships between components such as "between", "immediately between" or "adjacent to" and "directly adjacent to" may be construed similarly.

Singular forms "a", "an" and "the" in the present disclosure are intended to include the plural forms as well, unless the context clearly indicates otherwise. It will be further understood that terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

Identification letters (e.g., a, b, c, etc.) in respective steps are used for the sake of explanation and do not limit the order of respective steps. The respective steps may be changed from a mentioned order unless specifically mentioned in context. Namely, respective steps may be performed in the same order as described, may be substantially simultaneously performed, or may be performed in a different order.

In an embodiment of the present invention, a method may be implemented as code that can be read by a processor as a program recorded on a medium. The processor-readable medium may include any type of device in which data that can be read by a computer system is stored. The processor-readable medium may include a ROM, a RAM, a CD-ROM, a magnetic tape, a floppy disk, an optical data storage device, and the like. The computer-readable medium may be distributed over network-coupled computer systems so that the computer-readable code may be stored and executed in a distributed fashion.

The terms used in the present disclosure are merely used to describe particular embodiments, and are not intended to limit the present invention. Unless otherwise defined, all terms used herein, including technical or scientific terms, have the same meaning as those generally understood by those with ordinary knowledge in the field or art to which the present invention belongs.

FIG. 1 illustrates a mobile bill providing system 100 according to an embodiment of the present invention. The mobile bill providing system 100 includes at least one mobile bill issuing server 110, a mobile bill providing server 120, and a mobile terminal 130.

The mobile bill issuing server 110 may be a computing device that issues a statement or bill details for a particular user, and may be coupled to the mobile bill providing server 120 via a network 140. The mobile bill issuing server 110 is also coupled to the mobile terminal 130 via the network 140.

In an embodiment, the mobile bill issuing server 110 is managed by a service or goods providing company that provides a particular service or goods to the particular user and charges for the particular service or goods. For example, the mobile bill issuing server 110 may be managed by a service providing company such as a credit card company, a mobile carrier, an insurer, or the like, and may be coupled to a bill details database (DB) (not shown), which stores bill details for a plurality of users (or clients), via the network 140.

In an embodiment, the mobile bill issuing server 110 issues a mobile bill. Here, the mobile bill may be data including bill details for a particular user. The mobile bill issuing server 110 may inquire of the bill details DB about data corresponding to the bill details for the particular user, receive the data, and issue (or generate) the mobile bill in a pre-set format.

In another embodiment, the mobile bill issuing server 110 transmits the data including the bill details for the particular user to the mobile bill providing server 120 and the mobile bill providing server 120 generates a mobile bill. The mobile bill may include the bill details for the particular user and may be in a pre-set format. The mobile bill may be generated by the mobile bill issuing server 110 or the mobile bill providing server 120.

In an embodiment, the mobile bill issuing server 110 may be coupled to a subscription information DB (not shown) that stores user subscription information associated with reception of a mobile bill. For example, subscription information may include the user's name, phone number, mobile terminal ID, e-mail address, and the like. When a user requests a particular service, and a service provider sends a mobile notice rather than a conventional notice (i.e., an offline notice), the subscription information DB may store the user subscription information.

The mobile bill providing server 120 may be a computing device that performs a mobile bill providing method. In an embodiment, the mobile bill providing server 120 is managed by a company that provides a mobile bill service. Here, the mobile bill providing server 120 may be coupled to the mobile bill issuing server 110 and the mobile terminal 130 via the network 140.

In an embodiment, the mobile bill providing server 120 receives bill details for a particular user from the mobile bill issuing server 110 and generates a mobile bill. For example, the mobile bill providing server 120 may receive payment information dated October 2012 from a card company 'A' and generate a mobile bill including the payment information and having a particular format.

In an embodiment, the way a mobile bill is received and viewed on a mobile terminal may be dependent upon whether or not the mobile terminal has a bill viewer. In an embodiment, the mobile bill may be generated as data in a pre-set format, and may be displayed on a screen of the mobile terminal 130 through a bill viewer, which is an application installed in the mobile terminal 130 that allows the mobile terminal 130 to receive the mobile bill and display bill details for the particular user on the screen thereof.

In an embodiment, the mobile bill providing server 120 generates an electronic bill that can be viewed independent of a bill viewer. Here, the electronic bill may be one of a short message, a push message, and an e-mail, which includes an access key to the bill details for the particular user. For example, the mobile bill providing server 120 may generate a text message or an e-mail as the electronic bill. The text message or email is not displayed on a screen through a bill viewer, but is instead output through a general application installed in the mobile terminal 130. Here, the electronic bill may include a uniform resource locator (URL) allowing the particular user to check information regarding payment of the card company 'A'.

The mobile bill providing server 120 will be described in detail with reference to FIGS. 2A and 2B.

The mobile terminal 130 may be coupled to the mobile bill providing server 120 via the network 140. The mobile terminal 130 may be coupled to the mobile bill issuing server 110 via the network 140.

The mobile terminal 130 may be a computing device associated with the particular user. The mobile terminal 130 may include a mobile phone such as a smart phone, or a mobile personal computer (PC) such as a tablet PC.

In an embodiment, the mobile terminal 130 installs a bill viewer by which a mobile bill is output to a screen. For example, when the mobile terminal 130 is a smart phone, the mobile terminal 130 installs a bill viewer application through a particular operating system (OS) (e.g., android or iOS), and the particular user may check the mobile bill through the bill viewer application installed in the mobile terminal 130.

Figure 2A:
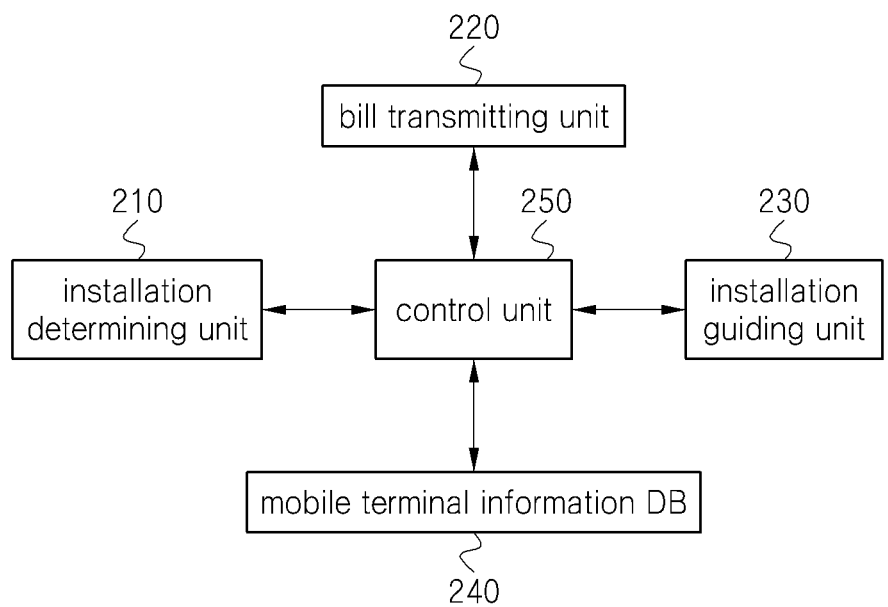
FIG. 2A is a block diagram of a mobile bill providing server according to an embodiment of the present invention.

FIG. 2A is a block diagram of a mobile bill providing server 120-1 according to an embodiment of the present invention. The mobile bill providing server 120-1 includes an installation determining unit 210, a bill transmitting unit 220, an installation guiding unit 230, a mobile terminal information DB 240, and a control unit 250.

In describing the mobile bill providing server 120-1 hereinafter, first, second, and third periods of time may correspond to periods that are independently set. In addition, these time periods may be set irrespective of an order thereof by a manager.

The installation determining unit 210 searches for a mobile terminal, e.g., the mobile terminal 130, associated with a particular user for whom a request for a mobile bill has been received.

In an embodiment, the installation determining unit 210 may inquire the mobile terminal information DB 240 about a mobile terminal identifier for the particular user. Here, the mobile terminal information DB 240 may be a repository for storing mobile terminal identifiers (e.g., phone numbers or terminal IDs) for a plurality of users.

After the mobile terminal 130 has been found, the installation determining unit 210 may determine whether or not the mobile terminal 130 has a bill viewer installed therein to output the mobile bill to a screen of the mobile terminal 130.

For example, when the particular user subscribed to receive the mobile bill, the particular user may have installed the bill viewer in the mobile terminal 130 and then deleted it. In this case, although the mobile bill providing server 120-1 provides the mobile bill to the mobile terminal 130, the mobile terminal 130 cannot output the mobile bill to a screen. Therefore, when the mobile terminal 130 has been found, the installation determining unit 210 determines whether or not the mobile terminal 130 has the bill viewer installed therein.

In an embodiment, the installation determining unit 210 may inquire of the mobile terminal 130 as to whether or not the mobile terminal 130 has the bill viewer installed therein. For example, the installation determining unit 210 may transmit a request to the mobile terminal 130 for installation details of the bill viewer and receive return data indicating whether or not the bill viewer is installed in the mobile terminal 130.

In another embodiment, the installation determining unit 210 may inquire of the mobile terminal information DB 240, which stores information regarding installation of a bill viewer in a plurality of mobile terminals, to determine whether or not a bill viewer has been installed in the mobile terminal 130. Here, the mobile terminal information DB 240 may store information regarding whether or not the mobile terminal 130 has the bill viewer installed therein at a particular point of time.

When a user accesses the mobile bill issuing server 110 or the mobile bill providing server 120-1 using a bill viewer, the installation determining unit 210 may record an access record (e.g., an access time) of the user in the mobile terminal information DB 240. For example, when access records of the particular user exist in the mobile terminal information DB 240, the installation determining unit 210 determines that the bill viewer has been installed in the mobile terminal 130. Therefore, when an operating system (OS) installed in the mobile terminal 130 cannot provide the installation details of the bill viewer to the installation determining unit 210, the installation determining unit 210 may determine whether or not it is necessary to install the bill viewer in the mobile terminal 130. In other words, in an embodiment, the installation determining unit 210 determines whether or not it is necessary to install the bill viewer in the mobile terminal based on information stored in the mobile terminal information DB 240.

In an embodiment, the installation determining unit 210 determines whether or not the mobile terminal 130 has the bill viewer installed therein at a point of time when the mobile bill is to be provided to the mobile terminal 130. For example, it is assumed that a mobile bill is requested for the particular user from the card company 'A' on the $10^{th}$ of every month. In this case, although the bill viewer was previously installed in the mobile terminal 130, the mobile terminal 130 may not have the bill viewer on a certain date, e.g., Dec. 10, 2012, in which the mobile bill is provided to the mobile terminal 130. Thus, the installation determining unit 210 determines whether or not the mobile terminal 130 has the bill viewer installed therein each time the mobile bill is to be provided to the mobile terminal 130.

In an embodiment, the installation determining unit 210 may inquire of the mobile terminal information DB 240 to determine whether or not the mobile terminal 130 has installed the bill viewer. In another embodiment, the installation determining unit 210 may transmit a push message, recognizable by the bill viewer, to the mobile terminal 130.

For example, if the mobile terminal 130 is a smart phone operated by an android OS, the installation determining unit 210 may transmit a push message to the mobile terminal 130 through a push server (e.g., a GOOGLE C2DM server). The push message may include data that can be recognized by the bill viewer and that enables the bill viewer to transmit return data corresponding to the push message. The installation determining unit 210 may determine whether or not the return data is received within a pre-set third period of time. Thus, the installation determining unit 210 may determine whether or not the return data is received from the bill viewer installed in the mobile terminal 130.

That is, the installation determining unit 210 may determine whether or not the bill viewer exists in the mobile terminal 130 when the mobile bill is to be provided to the mobile terminal 130 on the basis of whether or not the return data is received. If the return data is not received within the pre-set third period of time, the installation determining unit 210 may determine that a bill viewer does not exist in the mobile terminal 130 at the corresponding point in time. On the other hand, if the return data is received within the pre-set third period of time, the installation determining unit 210 may determine that a bill viewer exists in the mobile terminal 130.

When the return data is not received within the pre-set third period of time, the installation determining unit 210 may update information regarding the installation of the bill viewer for the mobile terminal 130 in the mobile terminal information DB 240. For example, the installation determining unit 210 may store a record of accessing the mobile terminal 130 in the mobile terminal information DB 240 to update the information so that the bill viewer will be installed in the mobile terminal 130 at a point of time for providing the mobile bill to the mobile terminal 130. If it is determined that a bill viewer does not exist in the mobile terminal 130 when the mobile bill is to be provided, the bill transmitting unit 220 transmits an electronic bill to the mobile terminal 130. The electronic bill may be viewed independent of whether a bill viewer is installed in the mobile terminal 130. That is, the electronic bill may be output to the screen even if a bill viewer does not exist in the mobile terminal 130. The electronic bill may be one of a short message, a push message, and an e-mail, which includes text and an access key (e.g., a URL for checking information regarding payment of the card company 'A') to the bill details for the particular user.

That is, although a mobile bill has been requested from the mobile bill issuing server 110, if the bill viewer has not been installed in the mobile terminal 130 or if the bill viewer has been deleted, disabled, or is otherwise inaccessible before the mobile bill is provided to the mobile terminal 130, the bill transmitting unit 220 may transmit the electronic bill to the mobile terminal 130, which may be output to the screen irrespective of installation of the bill viewer.

In an embodiment, when the access key to the bill details, which is included in the electronic bill, is checked, the bill transmitting unit 220 may check whether or not the corresponding bill details are valid. For example, when the mobile terminal 130 accesses a URL by which information regarding payment of the card company 'A' can be checked by the particular user, the bill transmitting unit 220 may check whether or not the corresponding payment information exists.

In an embodiment, when the bill viewer is installed in the mobile terminal 130 when the mobile bill is to be provided, the bill transmitting unit 220 may transmit a push message including an access key to the mobile bill to the mobile terminal 130. The access key to the mobile bill may include a command allowing the mobile terminal 130 to execute the bill viewer so as to output the mobile bill to the screen. Namely, when the bill viewer exists in the mobile terminal 130, the bill transmitting unit 220 may inform the particular user of transmission of the mobile bill using the push message.

Then, after sending the push message to the mobile terminal 130, the bill transmitting unit 220 may determine whether or not a return message corresponding to the push message is received within a pre-set second period of time. In an embodiment, the return message is received from the mobile terminal 130. When the bill viewer is executed to output the mobile bill to the screen, the mobile terminal 130 may transmit the return message to the bill transmitting unit 220.

In an embodiment, if the return message is not received within the pre-set second period of time, the bill transmitting unit 220 reduces the pre-set second period of time by stages and re-transmits the push message.

For example, if the return message is not received within a pre-set time of 12 hours, the bill transmitting unit 220 changes 12 hours to 6 hours and re-transmits the push message to the mobile terminal 130. After that, if the return message is still not received within 6 hours, the bill transmitting unit 220 changes 6 hours to 3 hours and re-transmits the push message to the mobile terminal 130. Namely, if the mobile bill is not checked by the particular user, the bill transmitting unit 220 sets a progressively shorter period of time for receiving the return message and re-transmits the push message to inform the particular user of transmission of the mobile bill.

The installation guiding unit 230 may transmit guidance information for installing the bill viewer to the mobile terminal 130.

In an embodiment, when the bill viewer has not been installed in the mobile terminal 130, the installation guiding unit 230 may transmit a guidance message including information regarding how to install the bill viewer. Here, the guidance message may be one of a short message, a push message, and an e-mail, which includes guidance text or a URL of a web page providing guidance information for the installation of the bill viewer.

For example, the installation guiding unit 230 may transmit one of a short message, a push message, and an e-mail, which includes a guidance message such as "You have requested a mobile bill but have not installed a bill viewer. Please click the URL below to go to a market to install the bill viewer. www-.market.com/mobile_bill".

In an embodiment, the installation guiding unit 230 may search for an e-mail address associated with the mobile terminal 130 and transmit the guidance message to the e-mail address. Here, the installation guiding unit 230 may inquire of the mobile terminal information DB 240, which stores information associated with the mobile terminal 130, including an associated e-mail address.

As described above, the mobile terminal information DB 240 may store user and mobile terminal identifiers (e.g., phone numbers or terminal IDs) for a plurality of users. The mobile terminal information DB 240 may store a record (e.g., an access time) of the mobile terminal 130 accessing the mobile bill issuing server 110 or the mobile bill providing server 120-1 through the bill viewer. The mobile terminal information DB 240 may store information regarding whether or not the mobile terminal 130 has the bill viewer installed therein. The mobile terminal information DB 240 may store information on the mobile terminal 130, including an e-mail address of the particular user.

The control unit 250 may control operations of the installation determining unit 210, the bill transmitting unit 220, the installation guiding unit 230, and the mobile terminal information DB 240, and a data flow among them.

Figure 2B:
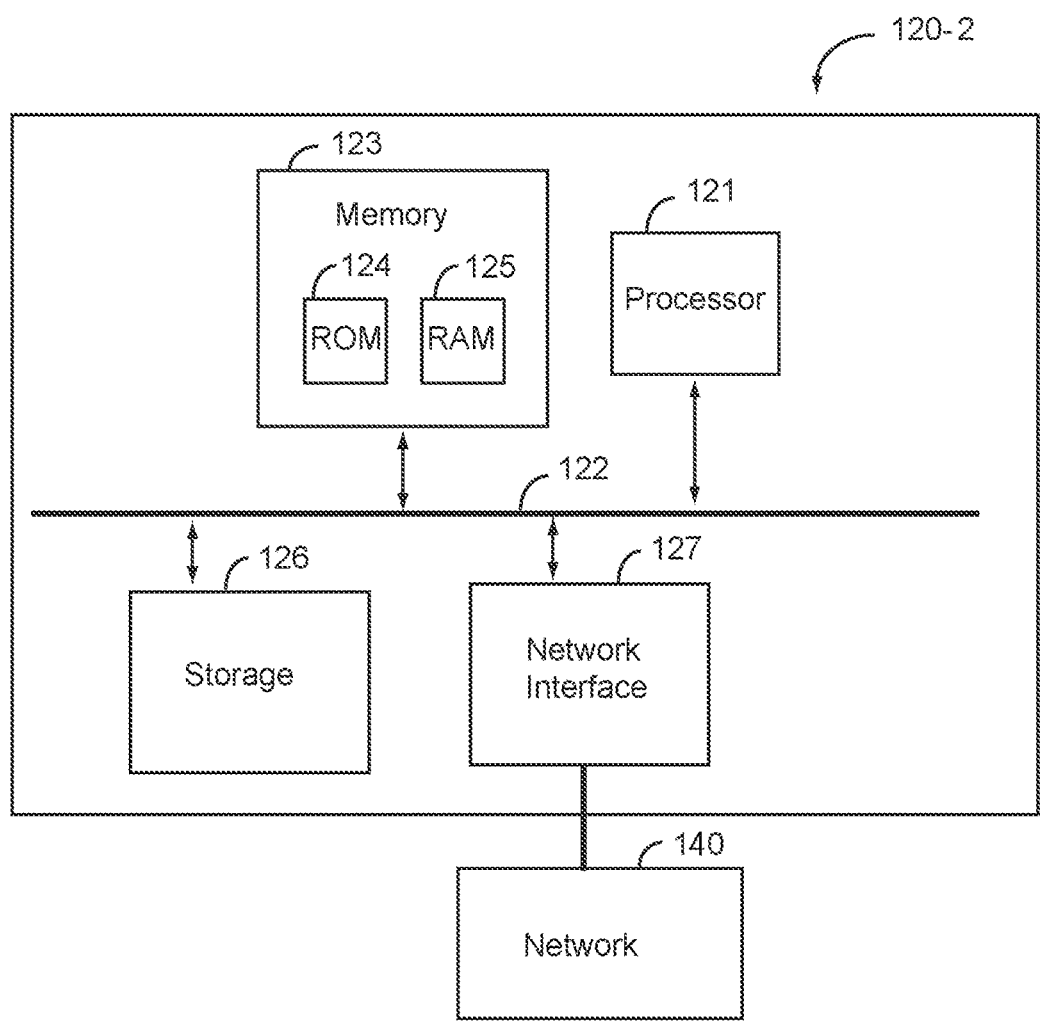
FIG. 2B illustrates a hardware configuration of a mobile bill providing server according to an embodiment of the present invention.

FIG. 2B illustrates a hardware configuration of a mobile bill providing server 120-2 according to an embodiment of the present invention. The mobile bill providing server 120-2 includes a processor or CPU 121 that is in communication with a variety of other components via a bus 122. Such other components of the mobile bill providing server 120-2 include, but are not limited to, a non-transitory computer readable storage medium as a memory 123, including a read only memory (ROM) 124 and a random access memory (RAM) 125, and also a higher capacity non-transitory computer readable storage medium 126.

One or more of these components may be employed by the mobile bill providing server 120-2 to store computer code including instructions for mobile bill provision.

The mobile bill providing server 120-2 also includes a network interface element 127. This network interface element 127 is configured to allow information, data, and/or signals to be transmitted between the mobile bill providing server 120-2 and the network 140. Since the mobile bill issuing server 110 and the mobile terminal 130 are coupled to the mobile bill providing server 120-2 via the network 140, such information, data, and/or signals may include the code that is executable on the mobile bill providing server 120-2, data including bill details from the mobile bill issuing server 110, an electronic or mobile bill to be transmitted to the mobile terminal 130, a return message, and so on.

In an embodiment, the components shown in FIG. 2A may be implemented using the components of the mobile bill providing server 120-2 shown in FIG. 2B.

Figure 3:
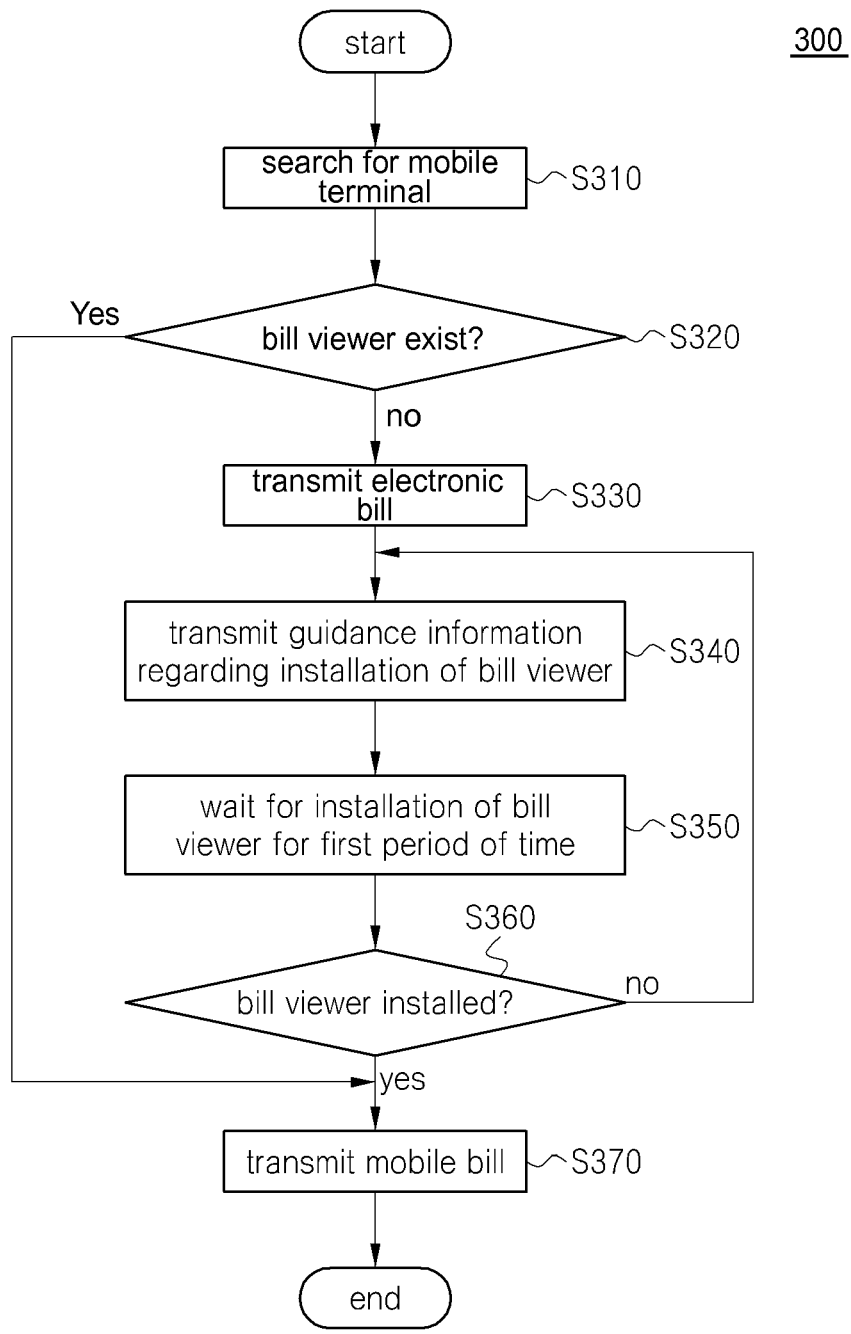
FIG. 3 is a flow chart illustrating a process of providing a mobile bill according to an embodiment of the present invention.

FIG. 3 is a flow chart illustrating a process 300 of providing a mobile bill according to an embodiment of the present invention. For convenience of description, the process 300 will be described with reference to FIG. 2A.

At S310, the installation determining unit 210 searches for a mobile terminal, e.g., the mobile terminal 130, associated with a particular user who has requested a mobile bill, or for whom a mobile bill has been requested. The installation determining unit 210 may determine that the mobile terminal 130 for receiving the mobile bill is associated with the particular user for whom the mobile bill has been requested.

In an embodiment, the installation determining unit 210 inquires of the mobile terminal information DB 240 about a mobile terminal identifier of the particular user and determines that the mobile terminal 130 associated with the particular user.

Once the mobile terminal 130 is determined to be associated with the particular user, the installation determining unit 210 determines whether or not the mobile terminal 130 has a bill viewer installed therein at S320. That is, the installation determining unit 210 determines whether or not the bill viewer exists in the mobile terminal 130.

In an embodiment, the installation determining unit 210 inquires of the mobile terminal 130 as to whether or not the mobile terminal 130 has the bill viewer installed therein.

In another embodiment, the installation determining unit 210 inquires of the mobile terminal information DB 240, which stores information regarding whether or not a plurality of mobile terminals has the bill viewer installed therein, as to whether or not the mobile terminal 130 has the bill viewer installed therein.

In an embodiment, the installation determining unit 210 determines whether or not the mobile terminal 130 has the bill viewer installed therein at a point of time when the mobile bill is to be provided to the mobile terminal 130.

If it is determined that the mobile terminal 130 does not have the bill viewer installed therein, the bill transmitting unit 220 transmits an electronic bill to the mobile terminal 130 at S330. Here, the electronic bill may include one of a short message, a push message, and an e-mail, which is viewable independent of the bill viewer and includes an access key (e.g., a URL for checking information regarding payment of card company 'A') to bill details for the particular user. The electronic bill is not recognizable by the bill viewer.

Namely, even if the particular user has requested to receive the mobile bill, if it is determined that the mobile terminal 130 has not installed the bill viewer or if it is determined that the bill viewer has been deleted or cannot be executed when the mobile bill is to be provided to the mobile terminal 130, the bill transmitting unit 220 may transmit the electronic bill to the mobile terminal 130 instead of the mobile bill. As a result, the electronic bill may be output to a screen of the mobile terminal 130 irrespective of installation of the bill viewer.

The installation guiding unit 230 transmits guidance information regarding how to install the bill viewer to the mobile terminal 130 at S340.

In an embodiment, the installation guiding unit 230 transmits a guidance message including information regarding the installation of the bill viewer. Here, the guidance message may include one of a short message, a push message, and an e-mail, which includes guidance text or a URL of a web page providing the guidance information for the installation of the bill viewer.

For example, the installation guiding unit 230 transmits one of a short message, a push message, and an e-mail, which includes a guidance message such as "You have requested mobile bill but have not installed a bill viewer. Please click the URL below to go to a market to install the bill viewer. www.market.com/mobile_bill".

In an embodiment, the installation guiding unit 230 searches for an e-mail address associated with the mobile terminal 130 and transmits the guidance message to the associated e-mail address. Here, the installation guiding unit 230 may inquire of the mobile terminal information DB 240, which stores information on the mobile terminal 130 including an e-mail address of the particular user.

The installation determining unit 210 waits for the installation of the bill viewer at S350. Here, the installation determining unit 210 may wait for a pre-set first period of time after the guidance message is transmitted to the mobile terminal 130 and then determine whether or not the mobile terminal 130 has installed the bill viewer. For example, after performing step S330 and step S340, the installation determining unit 210 may wait for 12 hours without determining whether or not the mobile terminal 130 has installed the bill viewer.

Here, when the pre-set first period of time has elapsed, the installation determining unit 210 determines whether or not the mobile terminal 130 has installed the bill viewer at S360.

If it is determined that the mobile terminal 130 has installed the bill viewer, the bill transmitting unit 220 transmits the mobile bill to the mobile terminal 130 at S370.

If it is determined that the mobile terminal has not installed the bill viewer, the procedure repeats step S340. Here, the installation determining unit 210 may reduce the pre-set first period of time in stages, and prompt the mobile terminal 130 to install the bill viewer repeatedly.

Returning to step S320, if it is determined that the mobile terminal 130 has the bill viewer installed therein, the procedure goes to step S370, and the bill transmitting unit 220 transmits the mobile bill to the mobile terminal 130 at S370.

Figure 4:
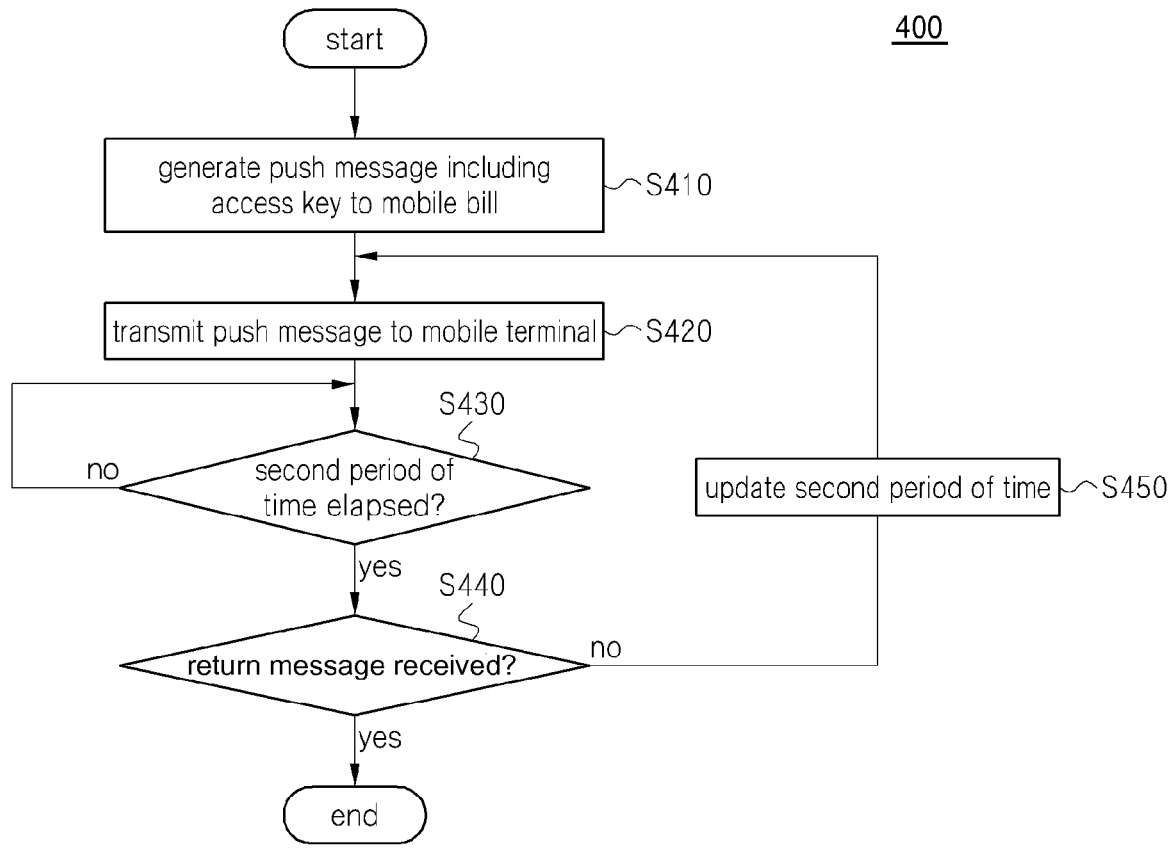
FIG. 4 is a flow chart illustrating a process of providing a mobile bill according to an embodiment of the present invention.

FIG. 4 is a flow chart illustrating a process 400 of providing a mobile bill according to an embodiment of the present invention. The process 400 may be included in step S370 of FIG. 3.

When it is determined that the bill viewer is installed in the mobile terminal 130, the bill transmitting unit 220 generates a push message including an access key to the mobile bill at S410. Here, the access key to the mobile bill may include a command allowing the mobile terminal 130 to execute the bill viewer and output the mobile bill to a screen of the mobile terminal 130.

The bill transmitting unit 220 transmits the push message to the mobile terminal 130 at S420.

Namely, the bill transmitting unit 220 may inform the particular user of transmission of the mobile bill using the push message.

After that, it is determined whether or not a pre-set second period of time has elapsed at S430. If it is determined the pre-set second period of time has elapsed, the bill transmitting unit 220 determines whether or not a return message corresponding to the push message is received from the mobile terminal 130 within the pre-set second period of time at S440). In an embodiment, when the bill viewer is executed and outputs the mobile bill to the screen, the mobile terminal 130 may transmit the return message to the bill transmitting unit 220. If the return message is not received within the pre-set second period of time, the bill transmitting unit 220 reduces the pre-set second period of time in stages to update the pre-set second period of time at S450. The bill transmitting unit 220 performs step S420 again.

For example, if the return message is not received within 12 hours, the bill transmitting unit 220 changes the pre-set second period of time from 12 hours to 6 hours and re-transmits the push message to the mobile terminal 130. In the next stage, if the return message is not received within 6 hours, the bill transmitting unit 220 changes 6 hours to 3 hours and re-transmits the push message to the mobile terminal 130 again. Namely, when the mobile bill is not checked by the particular user, the bill transmitting unit 220 sets progressively shorter periods of time in stages and transmits the push message repeatedly to inform the particular user of the transmission of the mobile bill.

Figure 5:
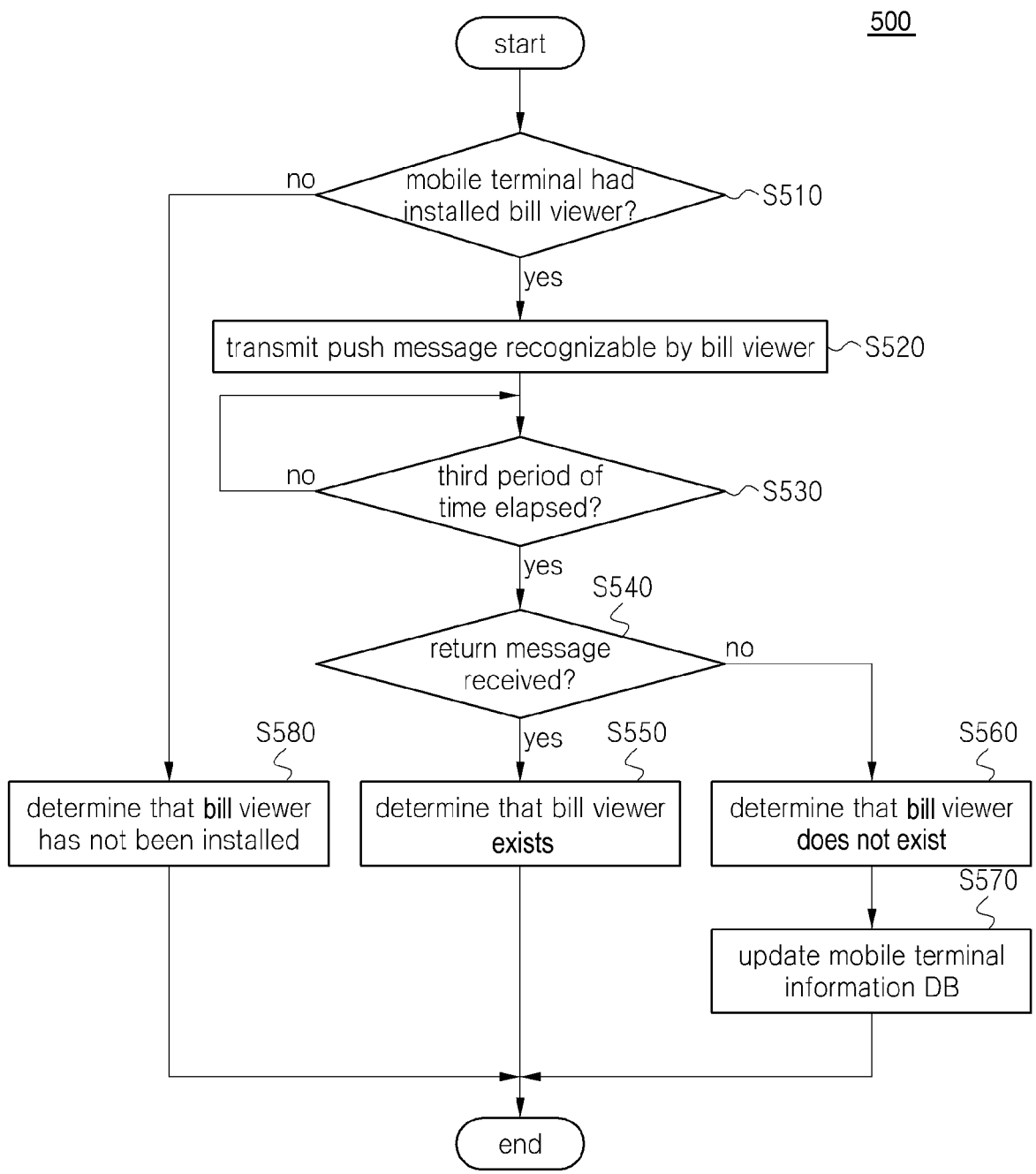
FIG. 5 is a flow chart illustrating a process of providing a mobile bill according to an embodiment of the present invention.

FIG. 5 is a flow chart illustrating a process 500 of providing a mobile bill according to an embodiment of the present invention. The process 500 may be included in of step S320 of FIG. 3.

The installation determining unit 210 determines whether or not the mobile terminal 130 has the bill viewer installed therein at the point of time when the mobile bill is to be provided to the mobile terminal 130.

For example, it is assumed that the particular user requests to receive the mobile bill from the card company 'A' on the 10$^{th}$ of every month. In this case, although the bill viewer was previously installed in the mobile terminal 130, the mobile terminal 130 may not have the bill viewer on a certain date, e.g., Dec. 10, 2012, in which the mobile bill is to be provided to the mobile terminal 130. Thus, the installation determining unit 210 determines whether or not the mobile terminal 130 has the bill viewer installed therein each time the mobile bill is to be provided to the mobile terminal 130.

The installation determining unit 210 may inquire of the mobile terminal information DB 240 to determine whether or not the mobile terminal 130 installed the bill viewer at S510. For example, when there is a record that the mobile terminal 130 had accessed the mobile bill providing server 120-2 using the bill viewer, the installation determining unit 210 determines that the mobile terminal 130 has installed the bill viewer.

If it is determined that there is no such record in the mobile terminal information DB 240, the installation determining unit 210 determines that the mobile terminal 130 does not have the bill viewer installed therein at S580.

If it is determined that the mobile terminal 130 has installed the bill viewer, the installation determining unit 210 transmits a push message recognizable by the bill viewer to the mobile terminal 130 at S520. Here, the push message may include data that can be recognized by the bill viewer and enables the bill viewer to transmit a return message corresponding to the push message to the mobile bill providing server 120-1.

The installation determining unit 210 determines whether or not the return message is received within the pre-set third period of time at S530 and S540. Namely, the installation determining unit 210 determines whether or not the return message is received from the bill viewer installed in the mobile terminal 130, and determines whether or not the bill viewer exists in the mobile terminal 130 on the basis of whether or not the return message is received.

If the return message is received within the pre-set third period of time, the installation determining unit 210 determines that the bill viewer exists in the mobile terminal 130 at S550.

If the return message is not received within the pre-set third period of time, the installation determining unit 210 determines that the bill viewer does not exist in the mobile terminal 130 at S560.

The installation determining unit 210 updates information regarding installation of the bill viewer in the mobile terminal information DB 240 at S570. For example, the installation determining unit 210 stores an access record of the mobile terminal 130 in the mobile terminal information DB 240 to update the information such that the bill viewer will be installed in the mobile terminal 130 at a point of time when a mobile bill is to be provided to the mobile terminal 130.

While the present invention has been shown and described in connection with various embodiments, it will be apparent to those skilled in the art that modifications and variations can be made without departing from the spirit and scope of the invention as defined by the appended claims.

What is claimed is:

1. A mobile bill providing method performed by a mobile bill providing server, the method comprising:
searching for a mobile terminal associated with a particular user and determining whether or not the mobile terminal has a bill viewer installed therein, the bill viewer being an application executed to output a mobile bill to a screen of the mobile terminal, the mobile bill being generated based on bill details for the particular user;
if it is determined that the mobile terminal does not have the bill viewer, transmitting an electronic bill and transmitting guidance information regarding how to install the bill viewer to the mobile terminal, the electronic bill being output to the screen regardless of the installation of the bill viewer;
determining if the bill viewer is installed in the mobile terminal after a first period of time after the guidance information is transmitted; and
if the bill viewer is installed in the mobile terminal, transmitting the mobile bill to the mobile terminal.

2. The method of claim 1, wherein transmitting the guidance information comprises:
transmitting one of a short message, a push message, and an e-mail, which includes guidance text or a uniform resource locator (URL) of a web page providing the guidance information, to the mobile terminal.

3. The method of claim 1, wherein transmitting the electronic bill comprises:
transmitting one of a short message, a push message, and an e-mail, which includes an access key to the bill details, as the electronic bill to the mobile terminal.

4. The method of claim 1, wherein transmitting the mobile bill comprises:
transmitting a push message including an access key to the mobile bill to the mobile terminal.

5. The method of claim 4, wherein transmitting the mobile bill further comprises:
determining whether or not a return message corresponding to the push message is received from the mobile terminal within a second period of time; and
if the return message is not received within the second period of time, reducing the second period of time in stages to update the second period of time and re-transmitting the push message to the mobile terminal.

6. The method of claim 1, wherein determining whether or not the mobile terminal has the bill viewer comprises:
inquiring of a mobile terminal information database (DB), which stores information regarding whether the bill viewer has been installed in a plurality of mobile terminals, as to whether or not the mobile terminal has installed the bill viewer therein.

7. The method of claim 6, if it is determined that the mobile terminal has installed the bill viewer therein, further comprising:
transmitting a push message recognizable by the bill viewer to the mobile terminal.

8. The method of claim 7, further comprising:
determining whether or not a return message corresponding to the push message is received within a third period of time.

9. The method of claim 8, further comprising:
if the return message is not received within the third period of time, determining that the bill viewer does not exist in the mobile terminal.

10. The method of claim 9, further comprising:
if the return message is not received within the third period of time, updating information regarding the installation of the bill viewer for the mobile terminal in the mobile terminal information DB.

11. A mobile bill providing server, comprising:
an installation determining unit configured to search for a mobile terminal associated with a particular user and determine whether or not a bill viewer is installed in the mobile terminal, the bill viewer being an application executed to output a mobile bill to a screen of the mobile terminal, the mobile bill being generated based on bill details for the particular user;
a bill transmitting unit configured to transmit an electronic bill if it is determined that the mobile terminal does not have the bill viewer, the electronic bill being output to the screen regardless of the installation of the bill viewer; and
an installation guiding unit configured to transmit guidance information regarding how to install the bill viewer,
wherein the installation determining unit waits for a first period of time to determine if the bill viewer is installed in the mobile terminal, and when the bill viewer is installed, the bill transmitting unit transmits the mobile bill to the mobile terminal.

12. The mobile bill providing server of claim 11, wherein the installation guiding unit transmits one of a short message, a push message, and an e-mail, which includes guidance text or a uniform resource locator (URL) of a web page providing the guidance information, to the mobile terminal.

13. The mobile bill providing server of claim 11, wherein the bill transmitting unit transmits one of a short message, a push message, and an email, which includes an access key to the bill details, as the electronic bill to the mobile terminal.

14. The mobile bill providing server of claim 11, wherein, if it is determined that the bill viewer is installed in the mobile terminal, the bill transmitting unit transmits a push message including an access key to the mobile bill to the mobile terminal.

15. The mobile bill providing server of claim 14, wherein if a return message corresponding to the push message is not received within a second period of time, the bill transmitting unit reduces the second period of time in stages to update the second period of time and repeatedly transmits the push message to the mobile terminal.

16. The mobile bill providing server of claim 11, further comprising:
a mobile terminal information database (DB) configured to store information regarding whether or not the bill viewer has been installed in a plurality of mobile terminals,
wherein the installation determining unit inquires of the mobile terminal information DB as to whether or not the mobile terminal has installed the bill viewer therein.

17. The mobile bill providing server of claim 16, wherein if it is determined that the mobile terminal has installed the bill viewer therein, the installation determining unit transmits a push message recognizable by the bill viewer to the mobile terminal.

18. The mobile bill providing server of claim 17, wherein the installation determining unit determines whether or not a return message corresponding to the push message is received within a third period of time.

19. The mobile bill providing server of claim 18, wherein if the return message is not received within the third period of time, the installation determining unit determines that the bill viewer does not exist in the mobile terminal.

20. The mobile bill providing server of claim 19, wherein if the return message is not received within the third period of time, the installation determining unit updates information regarding the installation of the bill viewer for the mobile terminal in the mobile terminal information DB.

* * * * *